No. 718,886. PATENTED JAN. 20, 1903.
F. STINER.
FILTER.
APPLICATION FILED MAY 10, 1902.
NO MODEL. 3 SHEETS—SHEET 1.

Witnesses:
Nathan C. Lombard 2nd
Margaret C. Harrison.

Inventor:
Frank Stiner,
by Lombard & Cobb
Attys.

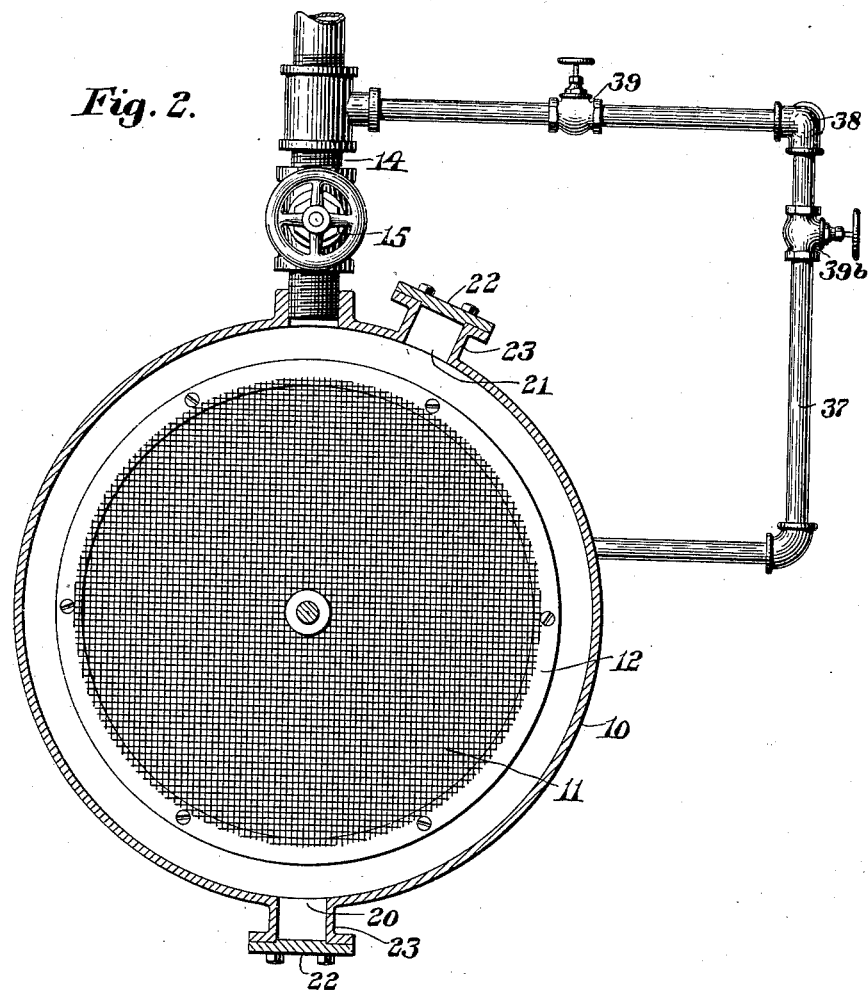
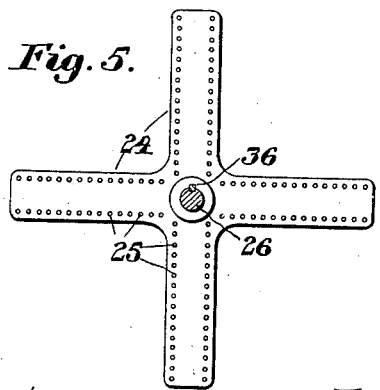

No. 718,886. PATENTED JAN. 20, 1903.
F. STINER.
FILTER.
APPLICATION FILED MAY 10, 1902.
NO MODEL. 3 SHEETS—SHEET 3.

Witnesses:
Nathan C. Lombard 2nd
Margaret A. Harrison.

Inventor:
Frank Stiner,
by Lombard & Cobb
Attys.

UNITED STATES PATENT OFFICE.

FRANK STINER, OF LAWRENCE, MASSACHUSETTS.

FILTER.

SPECIFICATION forming part of Letters Patent No. 718,886, dated January 20, 1903.

Application filed May 10, 1902. Serial No. 106,738. (No model.)

*To all whom it may concern:*

Be it known that I, FRANK STINER, a citizen of the United States of America, and a resident of Lawrence, in the county of Essex and State of Massachusetts, have invented certain new and useful Improvements in Filters, of which the following is a specification.

My invention relates to filters, and has for its object the provision of various features hereinafter described and claimed.

Figure 1:
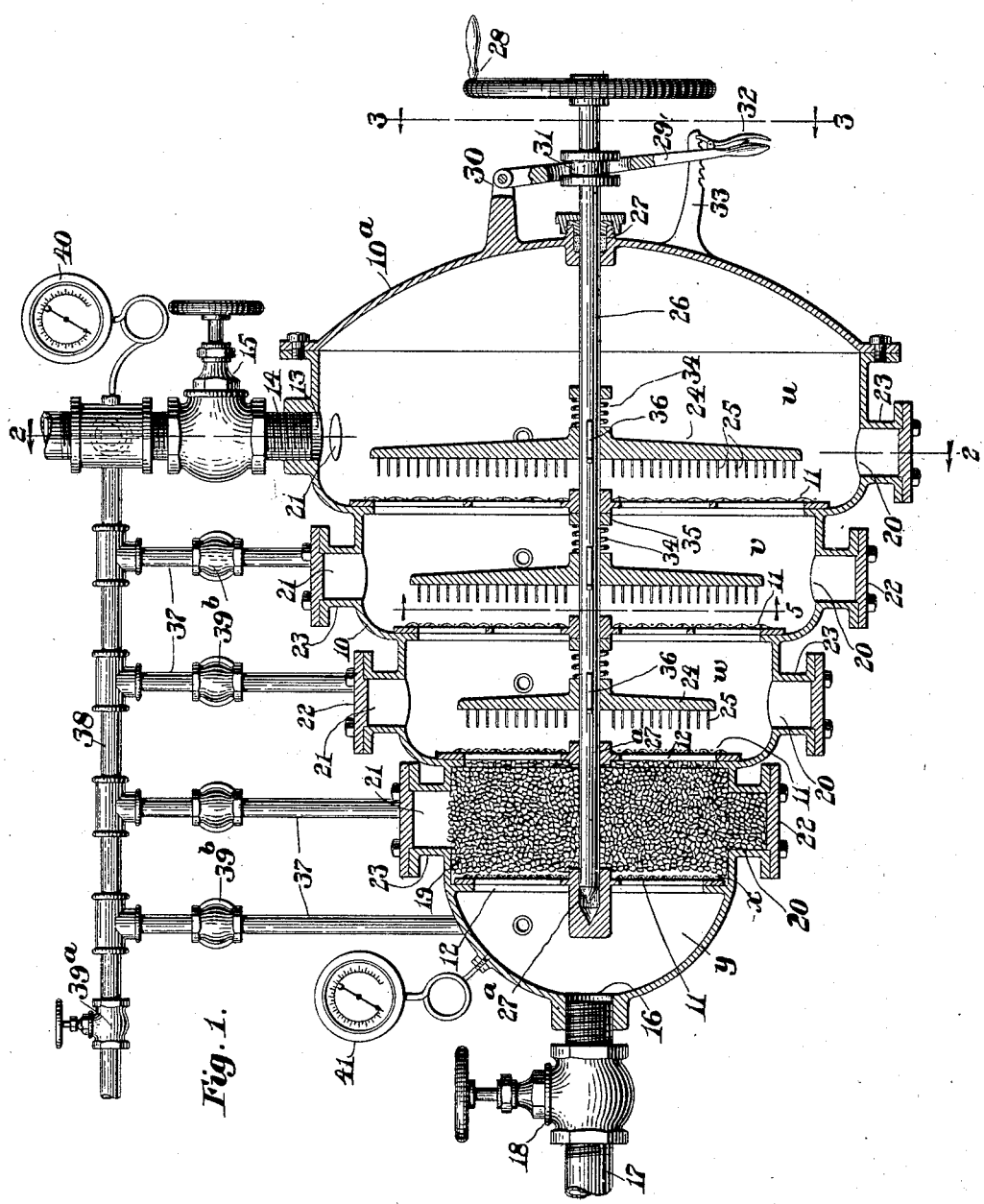
Figure 4:
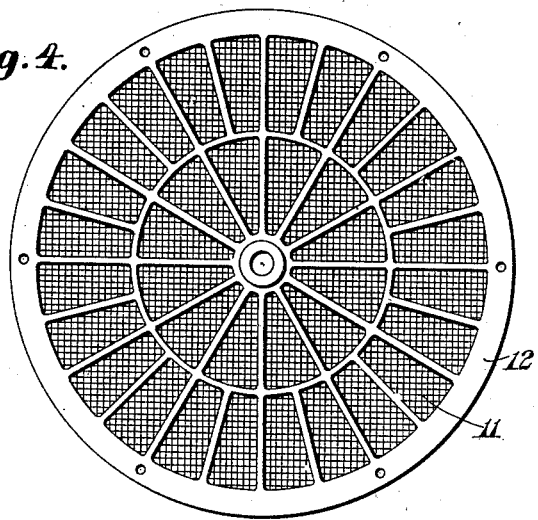
Figure 3:
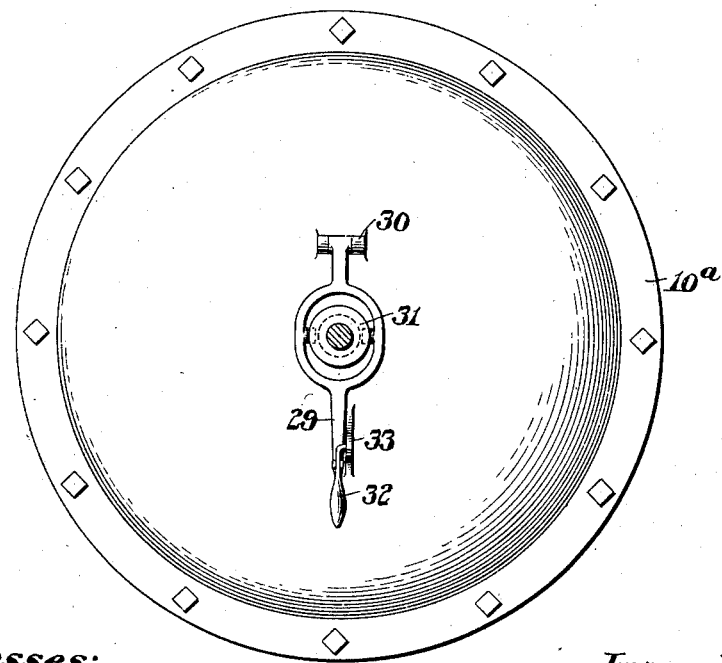

In the accompanying drawings, Figure 1 is a central vertical longitudinal section through a filter embodying one form of my invention. Fig. 2 is a vertical transverse section on the line 2 2 of Fig. 1. Fig. 3 is a similar view on the line 3 3 of Fig. 1. Fig. 4 is a detail in end elevation, showing one of the spiders and a sheet of filtering material supported thereby; and Fig. 5 is a transverse sectional detail on the line 5 5 of Fig. 1 of one of the cleaning members or brushes. All sections are taken in the direction indicated by the arrows.

Similar characters indicate like parts throughout the several figures of the drawings.

The numeral 10 designates an inclosing casing provided with a removable head $10^a$ and preferably formed in a series of chambers of gradually-increasing diameter, here shown as five in number and lettered $u$, $v$, $w$, $x$, and $y$. Within the casing at the inner side of the first four chambers is a substantially vertical partition of filtering material, which may consist of a foraminous or reticulated sheet or screen 11. Each screen is conveniently supported upon a spider 12, secured to the annular end wall of the chamber, each spider being of less diameter than the opening at the inlet side of the chamber, the outlet of which it is to close. At one end of the casing, conveniently at or near the top of the largest chamber $u$, is an inlet-opening 13 for the liquid to be filtered, which may be delivered through a pipe 14, provided with a valve 15. At the opposite end, here shown as at the axis of the casing through the wall of the chamber $y$, is an outlet-opening 16, from which a pipe 17, provided with a valve 18, carries away the discharge. The sheets of filtering material may have openings of gradually-decreasing diameter or mesh from inlet to outlet and forming at least a portion of a partition, or, as is illustrated in connection with the chamber $x$, filling the entire space between the sheets 11, may be a wall or layer 19 of some granular material, such as pulverized quartz. Each of the first four chambers is preferably provided with one or more openings to effect the discharge of accumulated solids retained by the partitions, one of these, 20, being shown in proximity to the lower edge of each screen 11 on the inlet side and a second opening 21 being situated at or near the upper edge. All these openings 20 and 21 may be closed by covers 22, bolted to flanged collars 23, surrounding the openings. In any chamber in which there is no granular material a cleaning member for the screens may be provided, these being here shown in the chambers $u$, $v$, and $w$ and consisting of a brush having arms 24 with projections 25, of wire or the like. These brushes are mounted to move over the inner faces of the screens upon a substantially horizontal rod or spindle 26, extending through a stuffing-box 27 in the head $10^a$ and having a bearing at $27^a$ in one or more of the spiders. The spindle and brushes may be rotated when desired by a crank 28. The brushes are normally out of contact with the screens and may be brought into coöperation with them by moving the spindle 26 longitudinally in its bearings—as, for example, by a lever 29, fulcrumed at 30 to the head of the casing and pivotally connected to the spindle at 31. A latch 32, coacting with a notched segment 33, may be used to retain the brushes in the desired position. To insure all the brushes bearing properly against the screens, they are preferably yieldably mounted for longitudinal movement upon the spindle by springs 34, interposed between the brushes and collars 35, fast upon the spindle. The brushes are splined to the spindle at 36 to permit this longitudinal movement while compelling rotation.

To aid in cleaning the partitions and to wash out accumulated solids, each chamber may be provided with means for introducing pressure, here shown as a pipe 37, connected with each chamber and with a feed-pipe 38, into which water may be delivered by some connection, as with the inlet-pipe of the filter, at one end or steam by a connection at the other end.

Valves 39 39ª in the feed-pipe control the admission of water and steam, respectively, and valves 39ᵇ in the pipes 37 govern the supply to each chamber. Gages 40 and 41 may be under the influence of pressure in the system, preferably at points respectively on the inlet side of the first filtering-partition and on the outlet side of the last partition.

Because of the gradually-decreasing diameters of the chambers and the like successive reduction in the dimensions of the spiders and brushes the internal elements of the filter may be readily assembled through the head. Then in use, the inlet and outlet valves being open and the valves 39, 39ª, and 39ᵇ closed, water enters the chamber $u$ of the filter and in its passage through the chambers $v$, $w$, and $x$ has the solid particles of various sizes successively removed by the partitions, each of which retains a finer grade than that before it, until when the granular material in the chamber $x$ is reached only the very finest remain, which are substantially all taken up thereby, and the water passes into the chamber $y$ and through the outlet in a purified state. As long as the filtering-partitions remain sufficiently clear to operate satisfactorily the pressure indicated by the gages 40 and 41 will remain nearly the same; but if they become unduly clogged the reading of the gage 41 will fall considerably below that of 40, and the attendant will know that a cleaning is necessary. He may then by means of the lever force the brushes against the partitions and rotate them to break up and remove the accumulation and, if necessary, may close the inlet and outlet valves and by taking off the covers of the openings 20 may open either or both of the valves 39 and 39ª and the valves 39ᵇ and flush out any or all of the chambers $u$, $v$, and $w$ with water or steam, or a mixture of the two, or the granular material may be removed from the chamber $x$ and this chamber and also $y$ blown out. It is also evident that by virtue of the position of the openings 20 solids will naturally gravitate toward them and gather in the well formed in the collars and in the space at the bottom of the chambers below the screens and removed from the inflow for a considerable time without clogging and may be discharged through openings 20 without blowing out. The openings 21 allow inspection of and ready access to the interior of the chambers and the filling of any of them desired with granular material.

It will be evident that this filter while effectual in purifying the water is easy to assemble and simple to clean or sterilize and keep in satisfactory operation.

Having thus described my invention, I claim—

1. In a filter, the combination with a casing, of a plurality of substantially vertical partitions of filtering material therein dividing the casing into chambers provided with openings for the discharge of accumulated solids on the inlet side of each partition, an inlet-pipe delivering to one of the end chambers, a discharge-pipe leading from the opposite end chamber, and a pressure-pipe connected with each of the chambers by which a fluid may be introduced for the purpose of cleaning the partitions.

2. In a filter, the combination with a casing, of a plurality of substantially vertical partitions of filtering material therein dividing the casing into chambers provided with openings for the discharge of accumulated solids on the inlet side of each partition and in proximity to the lower edge thereof, an inlet-pipe delivering to one of the end chambers, a discharge-pipe leading from the opposite end chamber at the axis of the casing, and a pressure-pipe connected with each of the chambers by which a fluid may be introduced for the purpose of cleaning the partitions.

3. In a filter, the combination with a casing, of a plurality of substantially vertical partitions of filtering material therein dividing the casing into chambers provided with openings for the discharge of accumulated solids on the inlet side of each partition, an inlet-pipe delivering to one of the end chambers, a discharge-pipe leading from the opposite end chamber, a pressure-pipe connected with each of the chambers by which a fluid may be introduced for the purpose of cleaning the partitions, and feed-pipes for both steam and water connected with the pressure-pipes.

4. In a filter, the combination with a casing, of a plurality of substantially vertical partitions of filtering material therein dividing the casing into chambers provided with openings for the discharge of accumulated solids on the inlet side of each partition, an inlet-pipe delivering to one of the end chambers, a discharge-pipe leading from the opposite end chamber, a pressure-pipe connected with each of the chambers by which a fluid may be introduced for the purpose of cleaning the partitions, and movable means for cleaning each of the partitions.

5. In a filter, the combination with a casing, of a plurality of substantially vertical partitions of filtering material therein dividing the casing into chambers provided with openings for the discharge of accumulated solids on the inlet side of each partition, an inlet-pipe delivering to one of the end chambers, a discharge-pipe leading from the opposite end chamber, a pressure-pipe connected with each of the chambers by which a fluid may be introduced for the purpose of cleaning the partitions, and a yieldably-mounted rotatable cleaning member movable toward and from each partition.

6. In a filter, the combination with a closed casing, of a plurality of substantially vertical partitions of filtering material therein dividing the casing into chambers provided with openings for the discharge of accumulated solids on the inlet side of each partition, an inlet-pipe delivering to one of the end chambers, a discharge-pipe leading from the opposite end chamber, a pressure-pipe connected with each of the chambers by which a fluid may be introduced for the purpose of cleaning the partitions, a stuffing-box situated in an opening in one of the end chambers, a spindle extending through the stuffing-box, and a cleaning member for each partition carried by the spindle.

7. In a filter, the combination with a casing provided with suitable openings, of a plurality of partitions of filtering material therein, a spindle extending through the casing, a brush movably mounted upon the spindle in proximity to each partition, a spring serving to normally press each brush toward its coacting partition, and means for rotating the brushes.

8. In a filter, the combination with a casing provided with inlet and outlet openings, of a spider located in the casing between the openings, a sheet of filtering material carried by the spider, a spindle journaled in the casing and spider, and a brush mounted upon the spindle in proximity to the filtering material.

9. In a filter, the combination with a casing comprising a plurality of chambers, of partitions of filtering material separating the chambers, brushes coacting with the partitions in certain of the chambers, and a filling of granular material in other of the chambers.

Signed by me at Boston, Massachusetts, this 3d day of May, 1902.

FRANK STINER.

Witnesses:
WALTER E. LOMBARD,
SYLVANUS H. COBB.